United States Patent
Cha et al.

(10) Patent No.: US 10,827,054 B2
(45) Date of Patent: Nov. 3, 2020

(54) MOBILE TERMINAL

(71) Applicant: LG ELECTRONICS INC., Seoul (KR)

(72) Inventors: Youngdo Cha, Seoul (KR); Yongho Lee, Seoul (KR); Bonghyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/479,563

(22) PCT Filed: Jan. 20, 2017

(86) PCT No.: PCT/KR2017/000731
§ 371 (c)(1),
(2) Date: Jul. 19, 2019

(87) PCT Pub. No.: WO2018/135679
PCT Pub. Date: Jul. 26, 2018

(65) Prior Publication Data
US 2019/0349459 A1 Nov. 14, 2019

(51) Int. Cl.
*H04M 1/03* (2006.01)
*H04R 1/02* (2006.01)

(52) U.S. Cl.
CPC ............ *H04M 1/03* (2013.01); *H04R 1/023* (2013.01); *H04R 2499/11* (2013.01)

(58) Field of Classification Search
CPC ...... H04R 2499/11; H04R 1/44; H04R 1/023; H04R 1/02; H04R 9/06; H04R 1/086;
(Continued)

(56) References Cited

U.S. PATENT DOCUMENTS 5,802,192 A * 9/1998 Katakawa .............. H04R 1/086
181/149
9,961,793 B1 * 5/2018 Wong ................. H04M 1/0249
(Continued)

FOREIGN PATENT DOCUMENTS

JP      2001128272      5/2001
JP       200641865      2/2006
(Continued)

OTHER PUBLICATIONS

PCT International Application No. PCT/KR2017/000731, International Search Report dated Oct. 18, 2017, 2 pages.
(Continued)

*Primary Examiner* — Lun-See Lao
(74) *Attorney, Agent, or Firm* — Lee, Hong, Degerman, Kang & Waimey

(57) ABSTRACT

The present invention provides a mobile terminal comprising: a terminal body including an opening region through which a sound is outputted; and a waterproof speaker module arranged adjacently to the opening region and outputting the sound, wherein the waterproof speaker module includes a speaker module forming the sound, a housing accommodating the speaker module and including a sound hole through which the sound is outputted, and a cover part connected to the housing so as to form a separation space in which the sound is outputted by the sound hole, and moved by a water pressure at least that of a certain reference pressure so as to cover the sound hole, thereby preventing the inflow of water into the speaker module.

14 Claims, 14 Drawing Sheets

(58) Field of Classification Search
CPC .......... H04R 31/006; H04R 2307/207; H04R 31/003; H04R 7/16; H04R 9/025; H04R 17/00; H04R 1/028; H04R 2307/025; H04R 11/02; H04R 1/08; H04R 1/1041; H04R 1/2842; H04R 2201/02; H04R 2209/024; H04R 2231/003; H04R 2307/204; H04R 2400/03; H04R 2400/11; H04R 2499/15; H04R 29/001; H04R 7/20; H04R 9/02; H04R 9/046; H04R 9/08; H04R 1/025; H04R 1/10; H04R 1/1058; H04R 2307/027; H04R 2307/029; H04R 2420/07; H04R 2420/09; H04R 2460/13; H04R 7/08; H04R 7/10; H04R 9/10; H04M 1/03; H04M 1/18; H04M 1/035; H04M 1/05; H04M 1/6066; H04M 1/6075; G04B 37/0075; G04B 37/08; G10K 11/002; G10K 11/18; G10K 11/24; G10K 2200/11; G10K 2210/127; G10K 2210/3214; G10K 2210/3223; H04B 11/00; H04B 13/02; H04N 5/2252
USPC ....... 381/334, 355, 150, 189, 386, 332, 374; 181/148–150; 361/679.01
See application file for complete search history.

(56) References Cited

U.S. PATENT DOCUMENTS

| | | | |
|---|---|---|---|
| 9,986,328 B2 * | 5/2018 | Suvanto | H04R 1/326 |
| 2012/0188690 A1 * | 7/2012 | Aihara | G03B 17/08 |
| | | | 361/679.01 |
| 2015/0335114 A1 * | 11/2015 | Stammbach | A45C 11/00 |
| | | | 224/191 |

FOREIGN PATENT DOCUMENTS

| | | | | |
|---|---|---|---|---|
| JP | 201117286 | * | 10/2011 | .............. H04R 1/02 |
| JP | 2011217286 | | 10/2011 | |
| JP | 2013009094 | | 1/2013 | |
| KR | 2020080004609 | | 10/2008 | |
| KR | 20140049348 | | 4/2014 | |
| KR | 1020150140134 | | 12/2015 | |

OTHER PUBLICATIONS

Korean Intellectual Property Office Application No. 10-2019-7017526, Notice of Allowance dated May 25, 2020, 7 pages.

* cited by examiner

MOBILE TERMINAL

CROSS-REFERENCE TO RELATED APPLICATIONS

This application is the National Stage filing under 35 U.S.C. 371 of International Application No. PCT/KR2017/000731, filed on Jan. 20, 2017, the contents of which are all hereby incorporated by reference herein in its entirety.

TECHNICAL FIELD

The present disclosure relates to a mobile terminal including a waterproof structure that may be used in water.

BACKGROUND ART

Terminals may be divided into mobile/portable devices and stationary devices according to mobility. Also, the mobile terminals may be classified into handheld types and vehicle mount types according to whether or not a user can directly carry.

The terminal has various functions according to development of technologies. For example, a mobile terminal can be allowed to capture still images or moving images, play music or video files, play games, receive broadcast and the like, so as to be implemented as an integrated multimedia player. Efforts are ongoing to support and increase the functionality of terminals. Such efforts include software improvements, as well as changes and improvements in the structural components.

In recent years, according to advancements in a waterproof function of a mobile terminal, a waterproof structure for blocking introduction of water is being developed. In particular, a hole is provided in a body of the mobile terminal for performing a function of a speaker module via which sound is output. However, when water flows into the hole, the speaker module may be damaged. Recently, a structure in which a waterproof layer is attached has been commercialized, wherein the waterproof layer is provided to block movement of water and output sound. However, since the waterproof layer may be damaged in water with high water pressure, there is such a problem that the waterproof function may not be performed properly.

DISCLOSURE

Technical Problem

An aspect of the present disclosure is to obviate the above-mentioned problem and other drawbacks, namely, to provide a mobile terminal in which a speaker module is waterproofed even in deep water with high pressure.

Technical Solution

To achieve these and other advantages and in accordance with the purpose of the present disclosure, as embodied and broadly described herein, there is provided a terminal body including an opening region through which sound is output; and a waterproof speaker module that is arranged adjacent to the opening region and outputs the sound, wherein the waterproof speaker module includes: a speaker module that forms the sound; a housing that accommodates the speaker module and includes a sound hole via which the sound is output; and a cover part that is connected to the housing to thereby form a separation space to which the sound is output through the sound hole, and covers the sound hole by moving according to water pressure equal to or higher than particular reference pressure, to thereby block water from flowing into the speaker module.

According to one embodiment of the present disclosure, the housing may include a first case, and a second case including a recessed area in which the cover part is mounted and which is connected to the sound hole, and the cover part may include a cover area seated in the recessed area in the second case by the external pressure and a protruding area protruding from the cover area and movably fixed to the second case. Accordingly, without having to place an additional control command, when the mobile terminal moves into water, the cover part may be moved by water pressure.

The cover part may include a first area having a plate shape and a second area protruding from the first area and movably mounted in the housing, and the cover part may be fixed to be relatively movable with respect to the housing, as a wire having one end fixed to the housing passes through the cover part. Thus, since the cover part may move when the cover part is connected to the wire, in such a case that water pressure is equal to or greater than particular reference pressure, the cover part may move by compressing an elastic portion.

Advantageous Effect

According to the present disclosure, when the mobile terminal is located on the ground or in water with relatively low water pressure, a sound output area is opened by a cover part according to an elastic portion. Therefore, the mobile terminal may output sound on the ground.

The cover part may cover a sound hole by moving according to particular reference pressure or more. Thus, even when it is difficult for a waterproofing layer to perform a waterproofing function under particular water pressure or more, water may be prevented from flowing into a speaker module.

BRIEF DESCRIPTION OF THE DRAWINGS

FIGS. 1B and 10 are views of a mobile terminal according to one embodiment of the present disclosure, viewed from different directions.

MODES FOR CARRYING OUT THE PREFERRED EMBODIMENTS

Figure 1A:
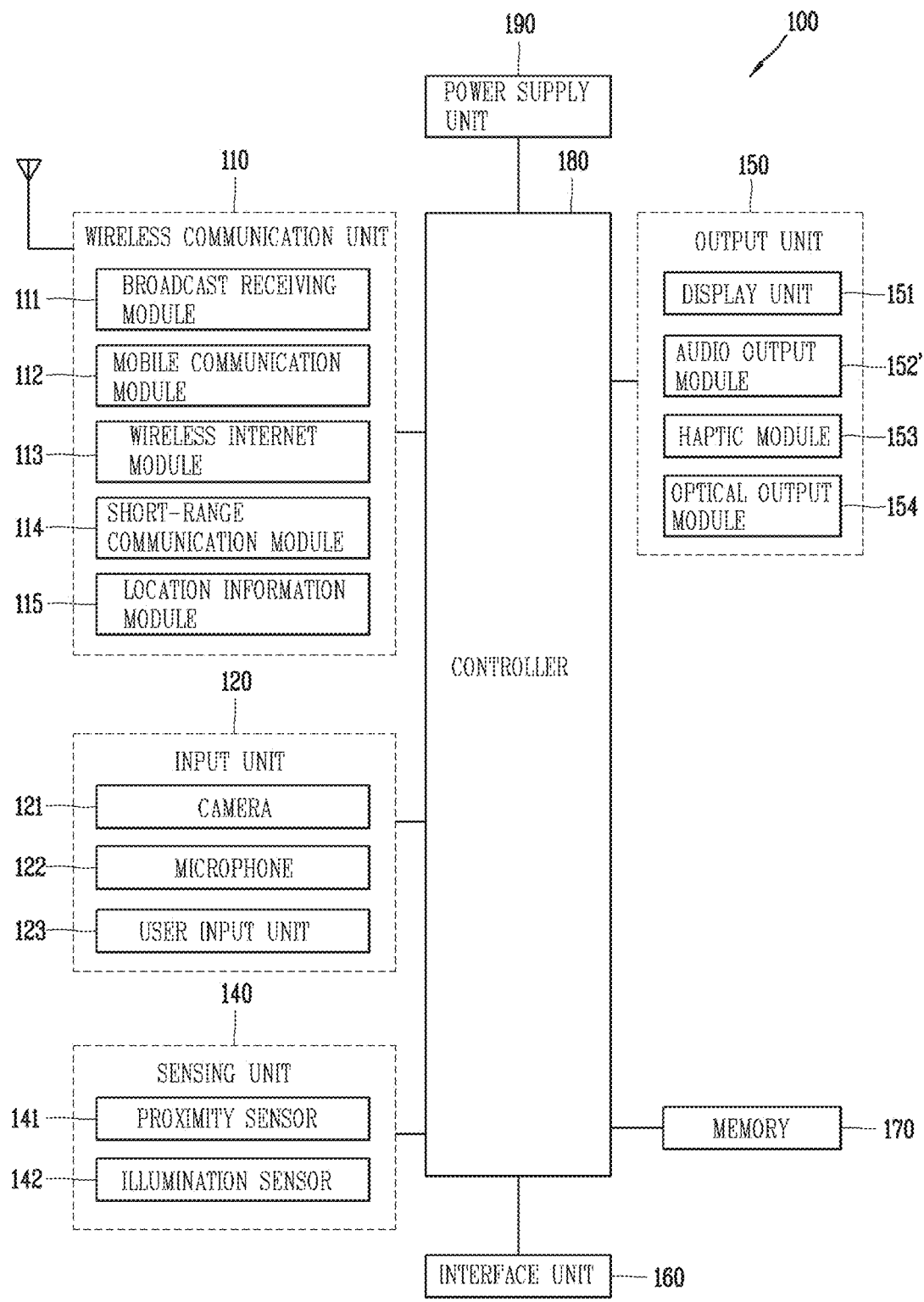
FIG. 1A is a block diagram for explaining a mobile terminal related to the present disclosure.

FIG. 1A is a block diagram for explaining a mobile terminal 100 related to the present disclosure.

The mobile terminal 100 may include a wireless communication unit 110, an input unit 120, a sensing unit 140, an output unit 150, an interface unit 160, a memory 170, a controller (or control unit) 180, a power supply unit 190. etc. FIG. 1 shows the mobile terminal 100 having various components, but it may be understood that implementing all of the illustrated components is not a requirement. Greater or fewer components may alternatively be implemented.

In more detail, the wireless communication unit 110 may include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may be implemented using one or more sensors configured to sense internal information of the mobile terminal 100, the surrounding environment of the mobile terminal 100, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, a red, green, and blue (RGB) sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from two or more sensors of the sensing unit 140, and combinations thereof.

The output unit 150 may be configured to output various types of information, such as audio, video, tactile output information, and the like. The output unit 150 may include at least one of a display unit 151, an audio output unit 152', a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless headset ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is implemented to store data to support various functions or features of the mobile terminal 100. For instance, the memory 170 may be configured to store application programs or applications executed in the mobile terminal 100, data or instructions for operations of the mobile terminal 100, and the like. At least one of these application programs may be downloaded from an external server via wireless communication. Other application programs may be installed within the mobile terminal 100 at time of manufacturing or shipping, which is the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or internal power in order to supply appropriate power required for operating elements and components included in the mobile terminal 100, under the control by the controller 180. The power supply unit 190 may include a battery, and the battery may be configured as an embedded battery or a replaceable battery.

At least some of the components may cooperatively operate to implement an operation, a control or a control method of the mobile terminal 100 according to various embodiments disclosed herein. Also, the operation, the control or the control method of the mobile terminal 100 may be implemented on the mobile terminal 100 by an activation of at least one application program stored in the memory 170.

Hereinafter, description will be given in more detail of the aforementioned components with reference to FIG. 1, prior to describing various embodiments implemented through the mobile terminal 100.

First, regarding the wireless communication unit 110, the broadcast receiving module 111 is configured to receive a broadcast signal and/or broadcast associated information from an external broadcast managing server via a broadcast channel. The broadcast channel may include a satellite channel, a terrestrial channel, or both. Two or more broadcast receiving modules may be provided to the mobile terminal 100 to facilitate simultaneous reception of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another electronic device may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal 100. As an example, the location information module 115 includes a Global Position System (GPS) module, a Wi-Fi module, or both. For example, when the mobile terminal 100 uses a GPS module, a position of the mobile terminal 100 may be acquired using a signal sent from a GPS satellite. As another example, when the mobile terminal 100 uses the Wi-Fi module, a position of the mobile terminal 100 may be acquired based on information related to a wireless access point (AP) which transmits or receives a wireless signal to or from the Wi-Fi module. If desired, the location information module 115 may alternatively or additionally perform a function of any of the other modules of the wireless communication unit 110 to obtain data related to the position of the mobile terminal 100. The location information module 115 is a module used for acquiring the position (or the current position) of the mobile terminal 100, and may not be limited to a module for directly calculating or acquiring the position of the electronic device.

Next, the input unit 120 is for inputting image information (or signal), audio information (or signal), data, or information input from a user. For inputting image information, the mobile terminal 100 may be provided with a plurality of cameras 121. Such cameras 121 may process image frames of still pictures or video obtained by image sensors in a video or image capture mode. The processed image frames can be displayed on the display unit 151 or stored in memory 170. Meanwhile, the cameras 121 provided in the mobile terminal 100 may be arranged in a matrix configuration to permit a plurality of image information having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. The microphone 122 may include assorted noise removing algorithms to remove unwanted noise generated in the course of receiving the external audio signal.

The user input unit 123 is a component that receives an input of information from a user. Such user input may enable the controller 180 to control operation of the mobile terminal 100 in correspondence with the received information. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal 100, surrounding environment information of the mobile terminal 100, user information, or the like, and generates a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the mobile terminal 100 covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, the controller 180 may process data corresponding to proximity touches and proximity touch patterns sensed by the proximity sensor 141, and cause visual information corresponding to the processed data to be output on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the touch screen, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the object in vicinity of the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output unit 152' may receive audio data from the wireless communication unit 110 or output audio data stored in the memory 170 during modes such as a signal reception mode, a call mode, a record mode, a voice recognition mode, a broadcast reception mode, and the like. The audio output unit 152' can provide audible output related to a particular function (e.g., a call signal reception sound, a message reception sound, etc.) performed by the mobile terminal 100. The audio output unit 152' may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source of the mobile terminal 100. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal 100 emits monochromatic light or light with a plurality of colors to a front or rear surface. The signal output may be terminated as the mobile terminal 100 senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal 100 meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, description will be given of a structure of the mobile terminal 100 according to the one embodiment of the present disclosure illustrated in FIG. 1A or a terminal having those components, with reference to FIGS. 1B and 1C.

Figure 1B:
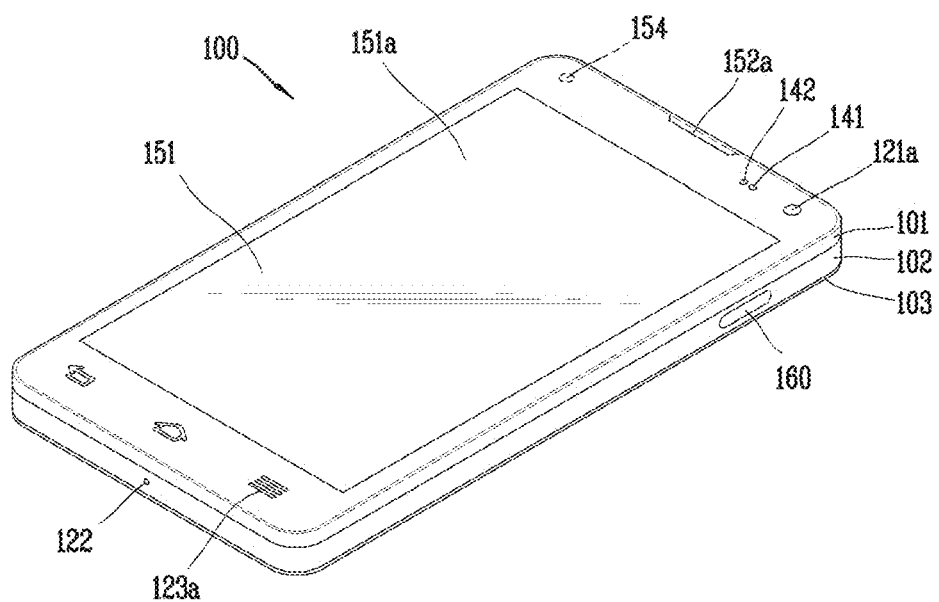
Figure 1C:
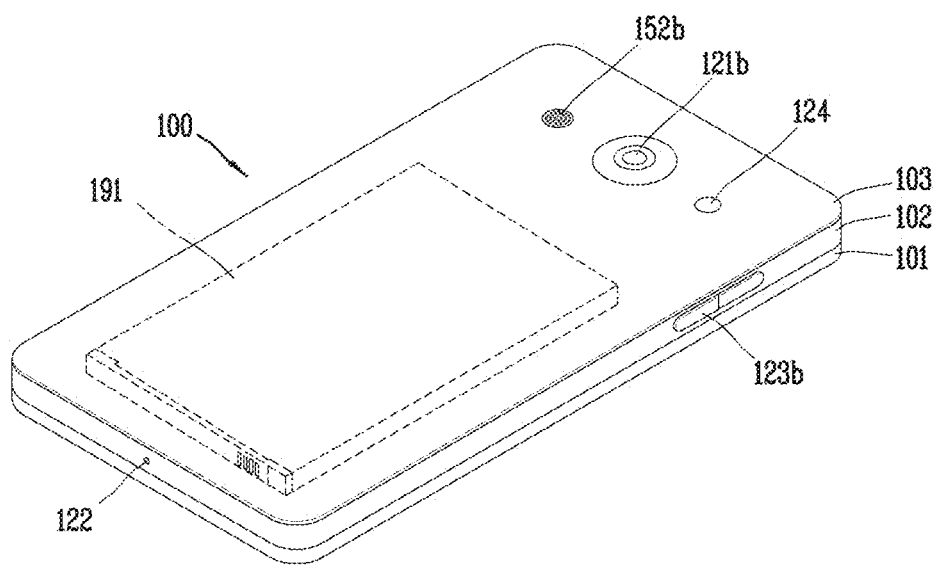

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally be applied to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming an appearance of the terminal. In this embodiment, the case is formed using a front case 101 and a rear case 102. Various electronic components are interposed into an inner space formed between the front case 101 and the rear case 102. At least one middle case may be additionally positioned between the front case 101 and the rear case 102.

The display unit 151 is shown located on a front side of the terminal body to output information. As illustrated, a window 151a of the display unit 151 may be mounted in the front case 101 to form a front surface of the terminal body together with the front case 101.

In some embodiments, electronic components may also be mounted in the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted in the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or the audio output unit 152b.

The front and rear cases 101 and 102 and the rear cover 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output units 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output unit 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output unit 152b and the second camera 121b.

However, those components may not be limited to the arrangement. Some components may be omitted or rearranged or located on different surfaces. For example, the first manipulation unit 123a may be located on another surface of the terminal body, and the second audio output unit 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and the controller 180 may generate a control command corresponding to the touch.

Contents input in the touch manner may be characters, numbers, instructions in various modes, or a menu item that can be designated.

On the other hand, the touch sensor may be configured in a form of a film having a touch pattern and disposed between the window 151a and a display (not illustrated) on a rear surface of the window 151a, or may be a metal wire directly patterned on the rear surface of the window 151a. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit 123 (see FIG. 1A). In some cases, the touch screen may replace at least some of functions of a first manipulation unit 123a. Hereinafter, for the sake of explanation, the display unit (display module) for outputting the image and the touch sensor are collectively referred to as a touch screen 151.

The first audio output unit 152a may be implemented as a receiver for transmitting a call sound to a user's ear and the second audio output unit 152b may be implemented as a loud speaker for outputting various alarm sounds or multimedia reproduction request sounds.

The window 151a of the display unit 151 may include a sound hole for emitting sounds generated from the first audio output unit 152a. However, the present disclosure is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output unit 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output unit 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least some of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller 180 may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output unit 152b may further be disposed on the terminal body. The second audio output unit 152b may implement stereophonic sound functions in conjunction with the first audio output unit 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear cover 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Figure 2A:
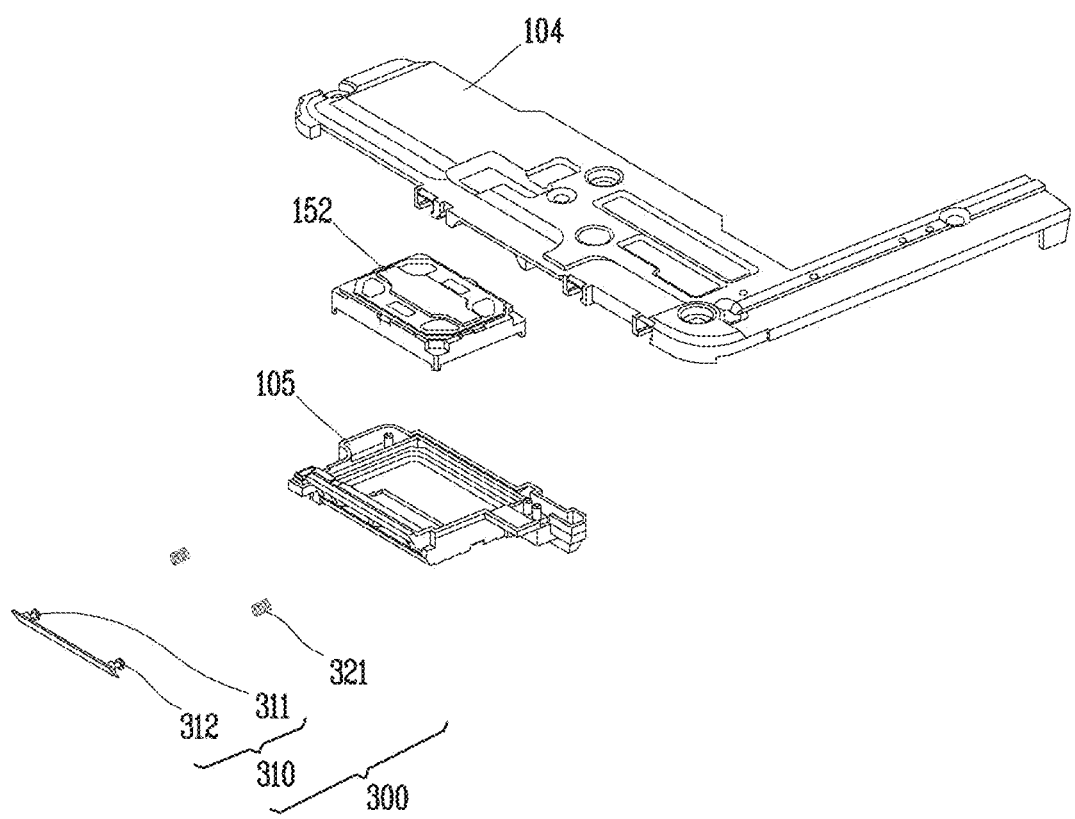
FIG. 2A is a conceptual view for explaining a speaker module and a waterproof unit in the present disclosure.

FIG. 2A is a conceptual view for explaining a speaker module and a waterproof unit in the present disclosure.

Figure 2B:
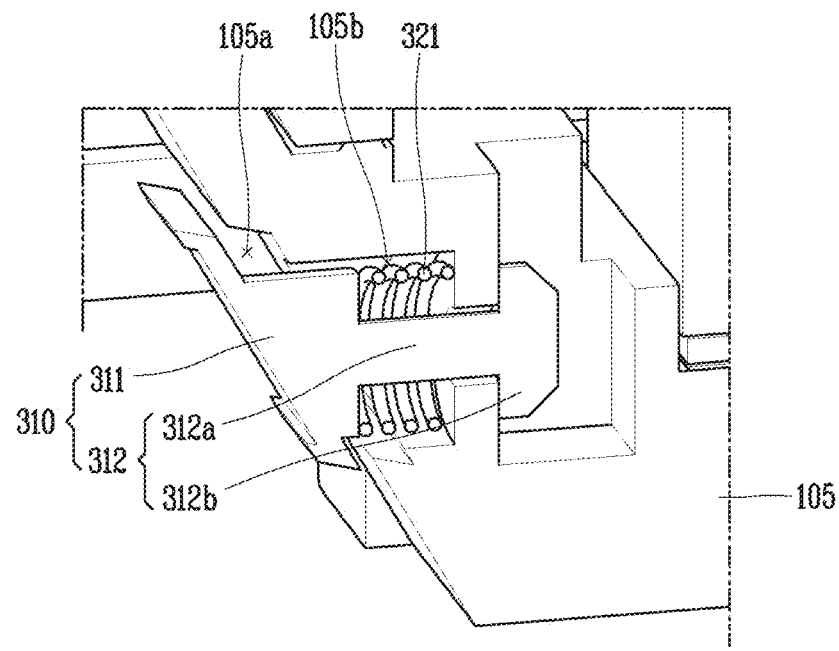
FIG. 2B is a partial cross-sectional view for explaining components of a waterproof unit in a waterproof speaker module.
Figure 2B:
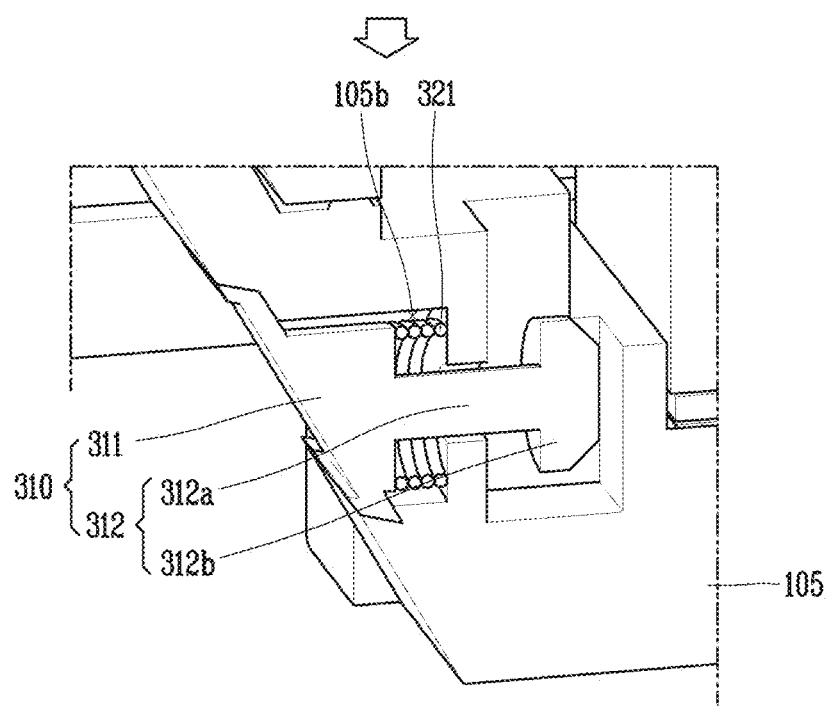

Referring to FIGS. 2A and 2B, generally, a speaker module 152 is accommodated in a housing and disposed inside a body of the mobile terminal 100. The mobile terminal 100 includes a waterproof unit 300 that waterproofs the housing to prevent water from flowing into the speaker module 152.

The housing may include first and second cases 104 and 105. The first and second cases 104 and 105 may include support frames for supporting different electronic components, respectively. For example, the first case 104 may include an antenna case in which an antenna module is provided.

The first and second cases 104 and 105 are coupled to each other to thereby form an internal space in which the speaker module 152 is disposed. In addition, the housing includes a sound hole 106 (shown in FIG. 3A) through which sound output from the speaker module 152 is emitted. The sound hole 106 may be provided in the second case 105.

The waterproof unit 300 according to the present disclosure is provided to cover the sound hole 106 (shown in FIG. 3) in the second case 105. The waterproof unit 300 includes a cover part 310 provided to cover the sound hole 106 and an elastic portion 321 provided to elastically support the cover part 310 against the second case 105.

The waterproof unit 300 opens or blocks the sound hole 106 in the second case 105 according to pressure in an area in which the body of the mobile terminal 100 is located. When the sound hole 106 is blocked, sound may not be output and water may be prevented from flowing through the sound hole 106.

FIG. 2B is a partial cross-sectional view for explaining components of a waterproof unit in a waterproof speaker module.

The cover part 310 includes a cover area 311 and a protruding area 312. The cover area 311 may be provided to have substantially a same shape as that of the sound hole 106 (shown in FIG. 3A) to thereby cover the sound hole 106. The second case 105 includes a recessed area 105a so that the cover area 311 is seated in the recessed area 105a.

The protruding area 312 includes first and second areas 312a and 312b. The first area 312a of the protruding area 312 protruding from the cover area 311 passes through a locking hole 105b in the second case 105. The second area 312b is provided at an end portion of the first area 312a, and has an outer circumference greater than an inner circumference of the locking hole 105b. Thus, the second area 312b may not pass through the locking hole 105b. An accommodation area 105c connected to the locking hole 105b is provided in the second case 105. The elastic portion 321 is arranged in the accommodation area 105c and elastically supports the cover area 311 against the second case 105. The cover area 311 is provided with an elastic force by the elastic portion 321 in a direction of getting away from the locking hole 105.

Therefore, the cover area 311 becomes apart from the recessed area 105a by the elastic force of the elastic portion 321. However, since the second area 312b is locked in the locking hole 105b, the cover area 311 may become apart from the sound hole 106 (shown in FIG. 3A) in the second case 105 to thereby output sound.

When an external force in a direction opposite to that of the elastic force is applied to the cover area 311, the elastic portion 321 is compressed and the protruding area 312 moves into the second case 105. The cover area 311 becomes in tight contact with the recessed area 105a, and thus, the sound hole 106 is blocked. Accordingly, sound may not be output and fluid may not flow through the sound hole 106.

Figure 3A:
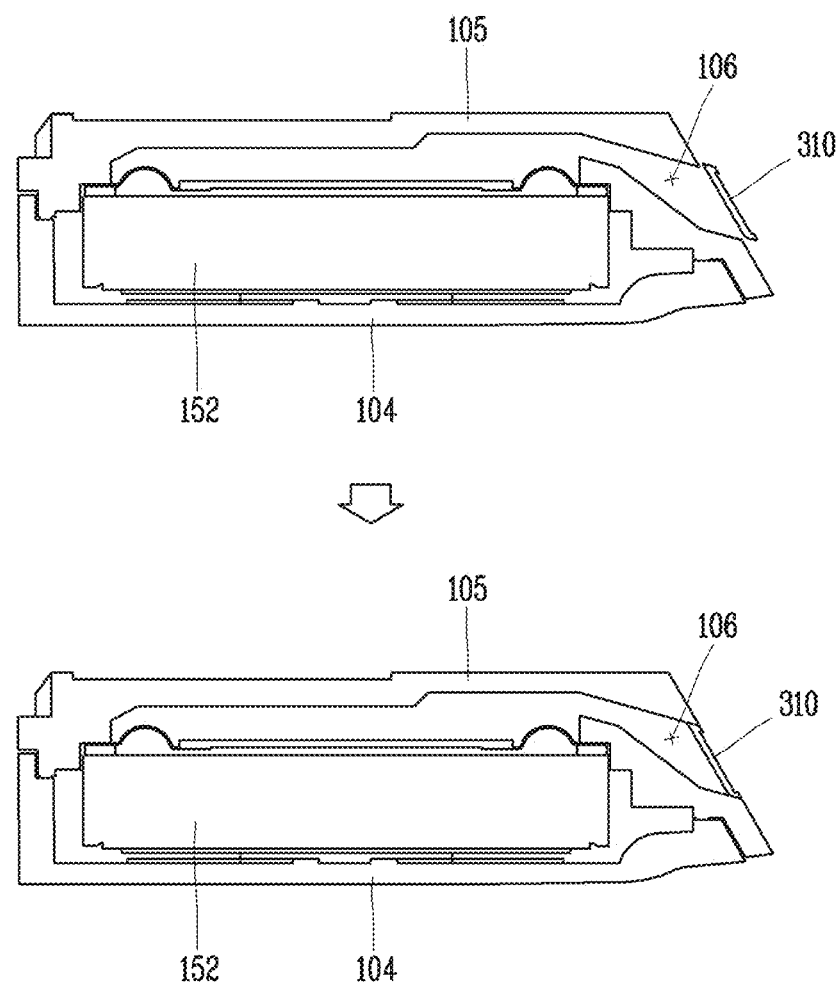
FIGS. 3A and 3B are cross-sectional views illustrating different areas taken along for explaining driving of the waterproof unit.
Figure 3B:
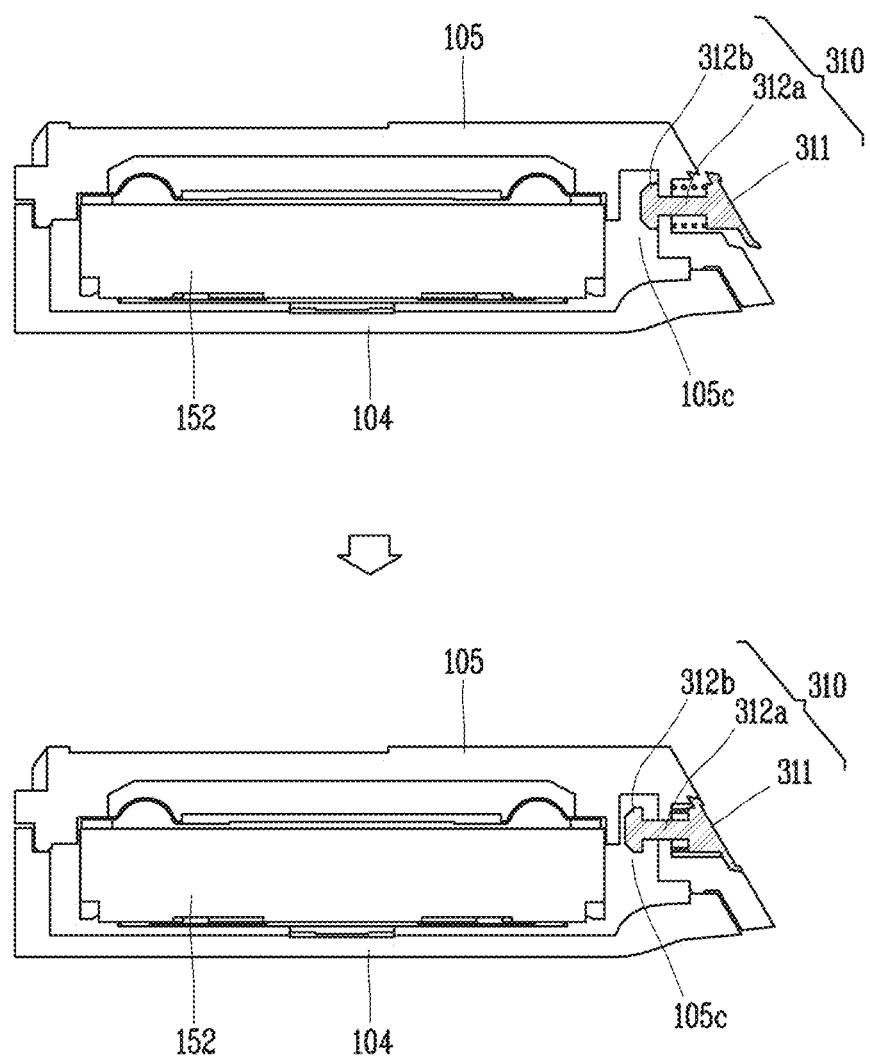

FIGS. 3A and 3B are cross-sectional views illustrating different areas taken along for explaining driving of a waterproof unit.

FIG. 3A is a cross-sectional view of the speaker module 152 and the first and second cases 104 and 105 of the housing taken along to include the cover area 311. FIG. 3B is a cross-sectional view illustrating the speaker module 152 and the first and second cases 104 and 105 of the housing taken along to include the protruding area 312.

Referring to FIGS. 3A and 3B, when an external force is not applied to the cover area 311, that is, when the mobile terminal 100 is located on the ground (a first state), the cover area 311 becomes apart from the second case 105 according to an elastic force of the elastic portion 321 applied to the cover area 311. The cover area 311 becomes apart from the recessed area 105a, and thus, the sound hole 106 is opened.

In the first state, the second area 312b of the protruding area 312 is locked in the locking hole 105b by the elastic force, and restricts movement of the cover area 311.

When an external force is applied to the cover area 311, the cover area 311 and the protruding area 312 move. Here, the external force may correspond to water pressure when the mobile terminal 100 moves into water. When the water pressure is greater than the elastic force, the cover area 311 moves to be seated in the recessed area 105a. Accordingly, as the sound hole 106 is blocked by the cover area 311, sound may not be output and introduction of water into the housing is also blocked.

Figure 4:
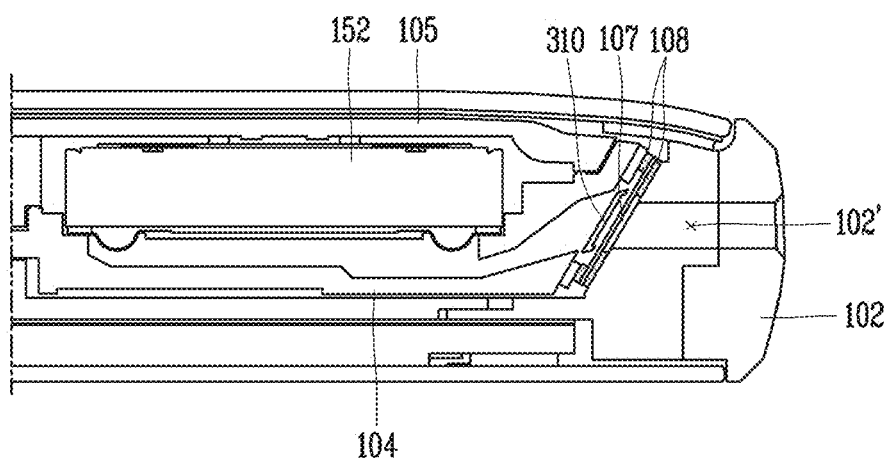
FIG. 4 is a partial cross-sectional view of a mobile terminal equipped with the waterproof speaker module of FIG. 2A.

FIG. 4 is a partial cross-sectional view of a mobile terminal equipped with the waterproof speaker module of FIG. 2B.

Referring to FIG. 4, the rear case 102 includes an opening region 102' facing the sound hole 106 (shown in FIG. 3A). The opening region 102' is covered by a waterproof layer 107 including a mesh material and/or Gore-tex. The waterproof layer 107 outputs sound caused by vibration but prevents introduction of water. An adhesive layer 108 is provided along edges of both surfaces of the waterproof layer 107. The waterproof layer 107 is attached to outer surfaces of the rear case 102 and the second case 105 by the adhesive layer 108.

According to the present embodiment, a structure in which introduction of water is prevented by blocking a sound hole in water with reference pressure or more is formed. Thus, movement of water may be blocked even in deep water. In addition, since the sound hole in the structure is opened on the ground, the sound hole is open when a waterproof function is not needed. Thus, quality of output sound is enhanced.

Figure 5A:
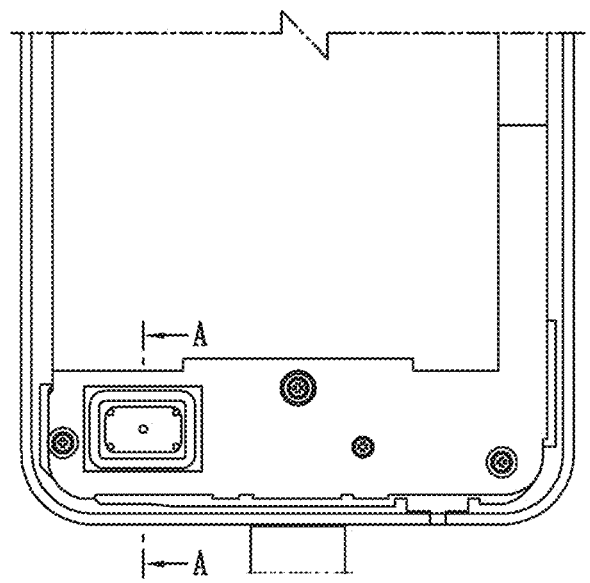
FIGS. 5A and 5B are conceptual views for explaining a waterproof speaker structure according to still another embodiment.
Figure 5B:
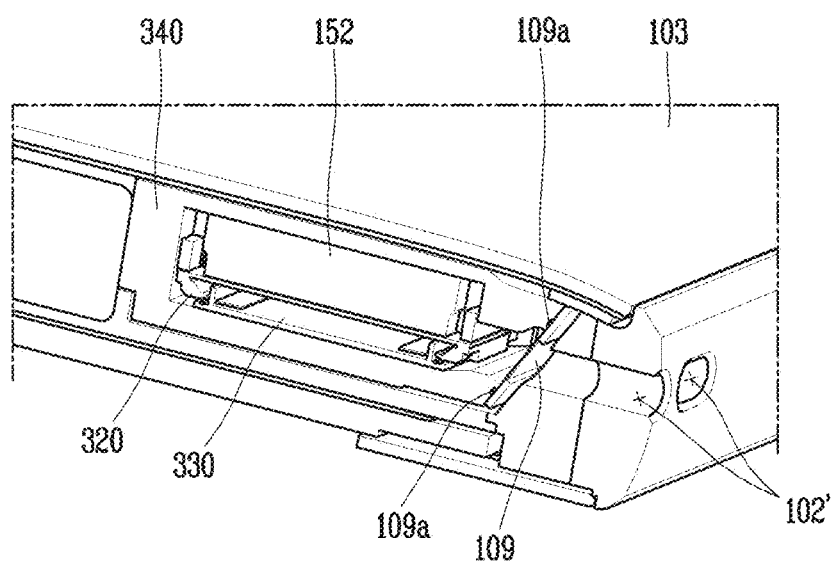

FIGS. 5A and 5B are conceptual views for explaining a waterproof speaker structure according to still another embodiment.

FIG. 5A illustrates a housing mounted in the rear case 102 (shown in FIG. 4) and equipped with the speaker module 152. FIG. 5B is a cross-sectional view of the housing taken along a line AA of FIG. 5A.

Referring to FIGS. 5A and 5B, a waterproof speaker module according to the present embodiment is provided in an inner space of the rear case 102. The waterproof speaker module includes the housing 340, a waterproof cover part 330, and a speaker module 152 accommodated in the housing 340.

The rear case 102 includes at least one opening region 102' connecting to an inner space in which the waterproof speaker module is provided. The housing 340 accommodates a body part 320 and the waterproof cover part 330, wherein the body part 320 receives the speaker module 152. The housing 340 also includes the sound hole 106 (shown in FIG. 3A) provided in an area facing the opening region 102'.

The waterproof speaker module further includes a waterproof layer 109 including the mesh material provided to cover the sound hole 106 (shown in FIG. 3A). The waterproof layer 109 includes at least one protrusion 109a. The at least one protrusion 109a is inserted into a fixing groove provided in the housing 340. The waterproof layer 109 may prevent water from flowing into the housing 340.

The body part 320 for accommodating the speaker module 152 is mounted in the housing 340. The body part 320 includes the waterproof cover part 330 for opening the body part 320 by external pressure. When the mobile terminal 100 is located in water, and thus, pressure increases, the waterproof cover part 330 moves to cover the body part 320 so that water does not flow into the speaker module 152.

Hereinafter, a structure of the waterproof cover part 330 fixed to the body part 320 to block introduction of water is described in detail.

Figure 6A:
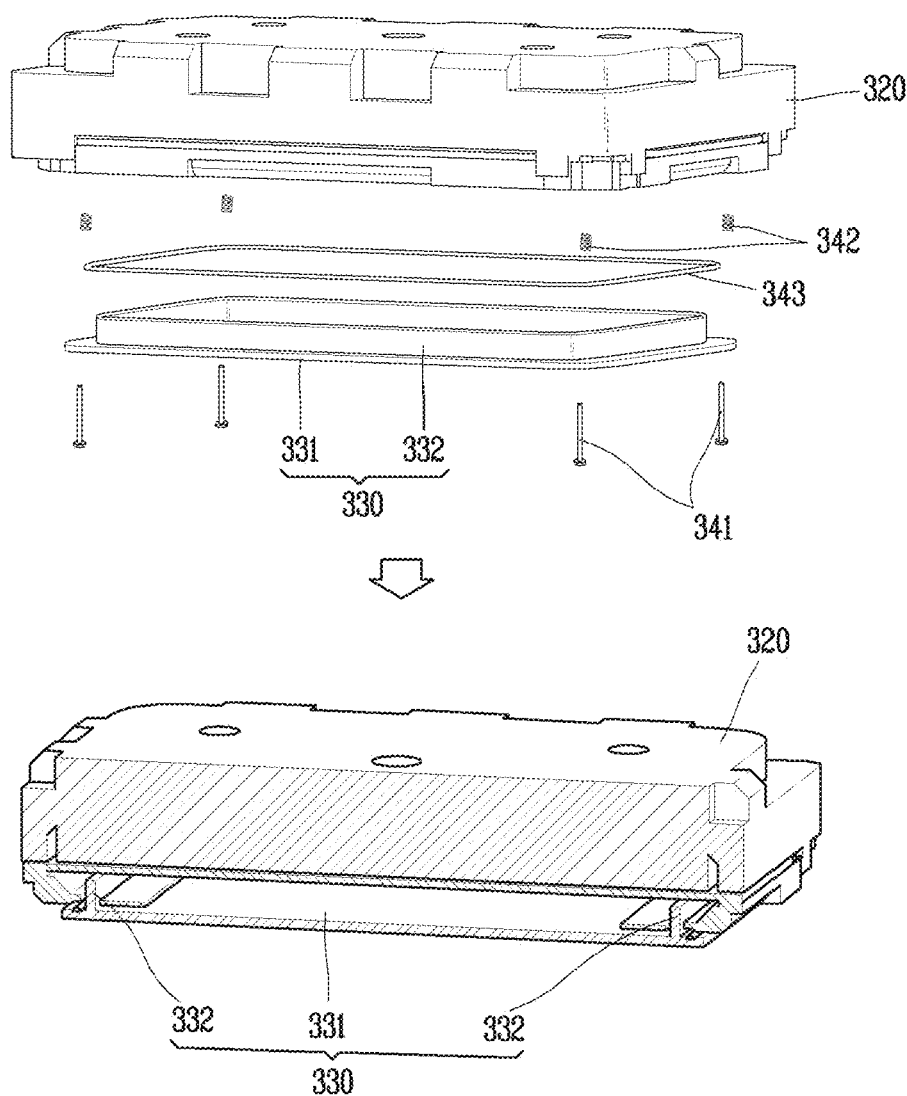
FIGS. 6A to 6C are conceptual views for explaining a structure of a cover part.
Figure 6B:
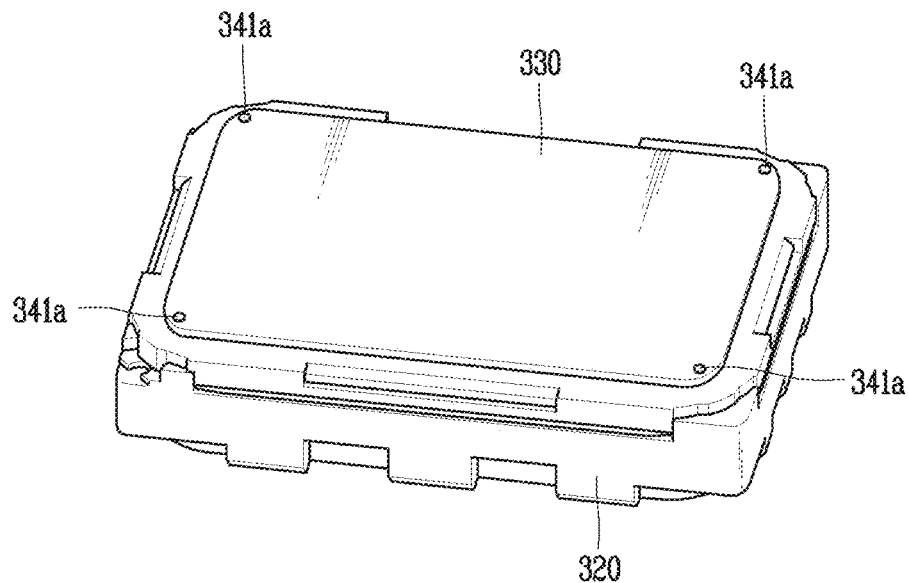
Figure 6C:
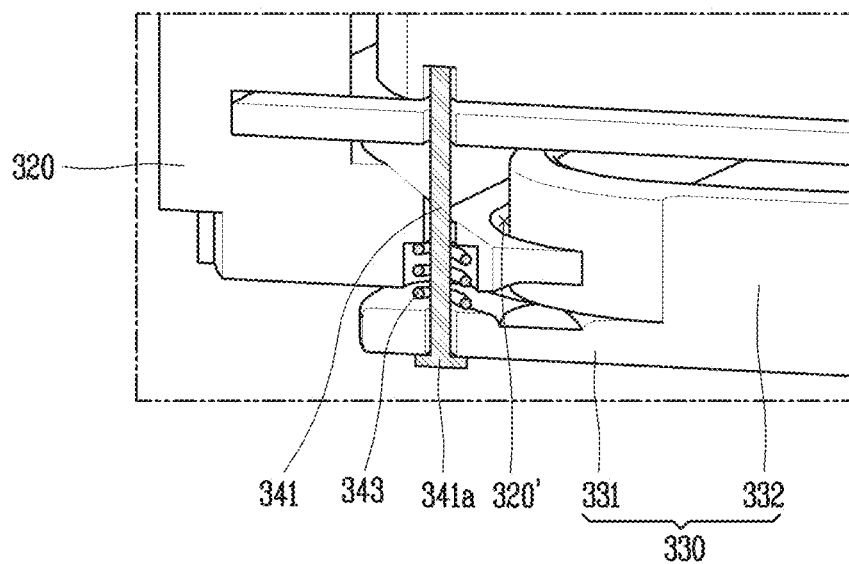

FIGS. 6A to 6C are conceptual views for explaining a structure of the cover part 330.

Referring to FIGS. 6A to 6C, an output area from which sound is output is provided on one surface of the body part 320. The waterproof cover part 330 is mounted to face the output area.

The waterproof cover part 330 includes a first area 331 having a plate shape, and a second area 332 protruding from the first area 331 to correspond to an edge area of the first area 331. The first area 331 is formed to overlap the output area.

The waterproof cover part 330 is fixed to the body part 320 by a wire 341. The wire 341 has a predetermined length and a locking portion 341a is provided at one end of the wire 341. The wire 341 passes through the first area 331 and is locked by the locking portion 341a. Another end of the wire 341 is fixed to the body part 320. The wire 341 fixes the waterproof cover part 330 and the body part 320, and fixes the waterproof cover part 330 so that the waterproof cover part 330 may move with respect to the body part 320. The waterproof cover part 330 may move away from or close to the body part 320.

A plurality of wires 341 may be coupled to the waterproof cover part 330 at predetermined intervals. The wire 341 may be mounted adjacent to an edge of the first area 331.

An elastic portion 342 is mounted on the wire 341. The elastic portion 342 is provided to cover the wire 341 and provides an elastic support so that the body part 320 is far from the waterproof cover part 330. A separation space is formed between the waterproof cover part 330 and the body part 320 by the elastic force of the elastic portion 342. However, since movement of the waterproof cover part 330 is restricted by the locking portion 341a, a size of the separation space is limited, and sound output by the speaker module 152 is output via the separation space.

The body part 320 includes a guide hole 320' provided so that the second area 332 is inserted into the guide hole 320'. As the second area 332 is inserted into the guide hole 320', the waterproof cover part 330 may move with respect to the body part 320.

The waterproof cover part 330 further includes a rubber portion 343 in the first area 331. The rubber portion 343 has a closed loop shape, and is provided along an outer periphery of the first area 331. The rubber portion 343 may be inserted into a portion recessed from one surface of the first area 331 facing the body portion 320. When the body part 320 is located close to the waterproof cover part 330, the rubber portion 343 blocks a portion between the body part 320 and the first area 331 to prevent introduction of water.

Figure 7:
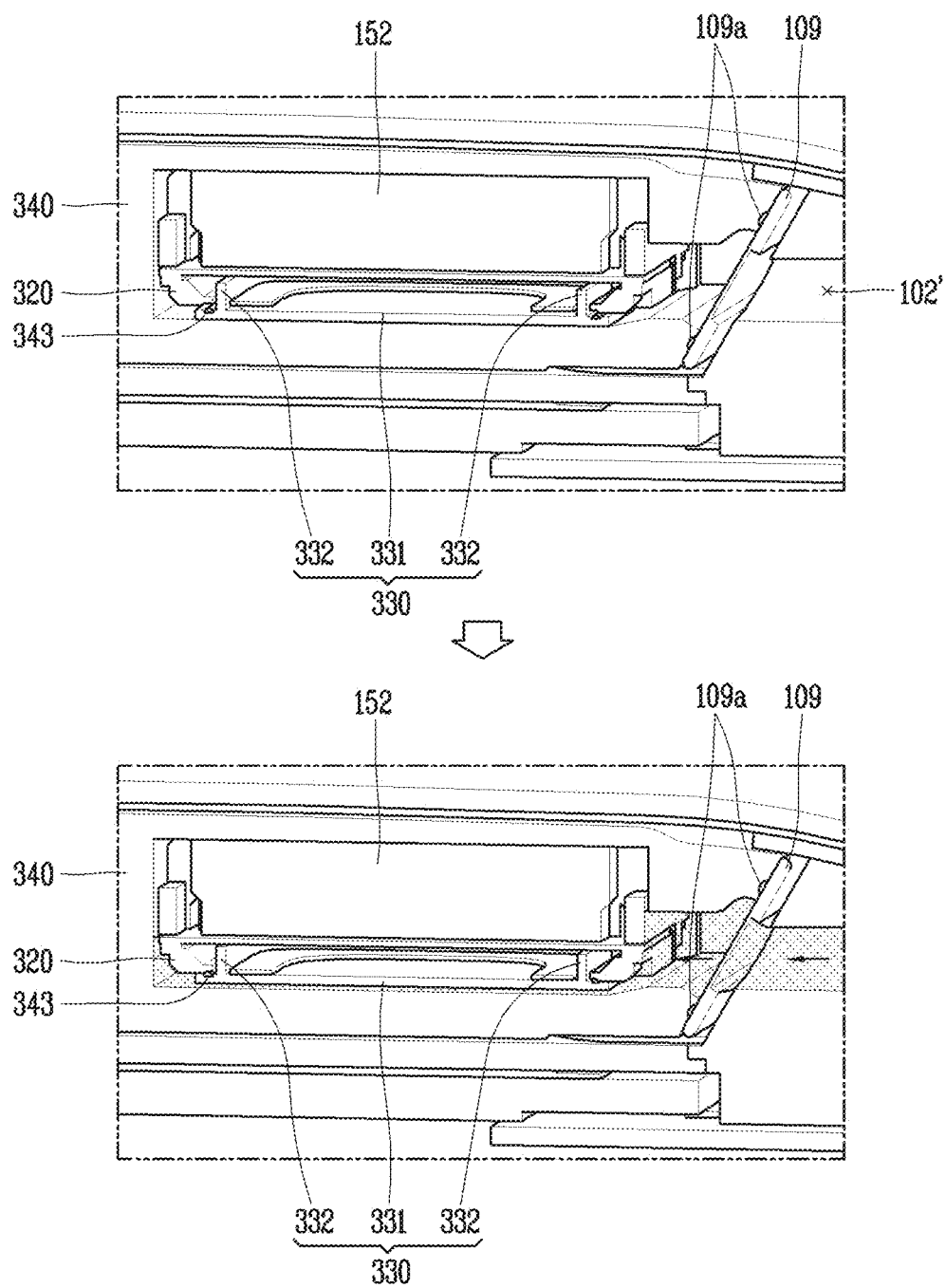
FIG. 7 is a conceptual view for explaining a waterproof speaker module driven by water pressure.

FIG. 7 is a conceptual view for explaining a waterproof speaker module driven by water pressure.

Referring to FIGS. 6A and 7 together, when the mobile terminal 100 is located on the ground or in water with less than particular pressure, the waterproof layer 109 including the mesh material prevents introduction of water into the mobile terminal 100.

In this state, the waterproof cover part 330 is arranged to be apart from the body part 320 due to an elastic force of the elastic portion 342. Accordingly, sound from the audio output unit 152' is output to the separation space between the body part 320 and the waterproof cover part 330.

When particular external pressure or more occurs in water, as the water passes through the waterproof layer 109 and flows into the mobile terminals 100 or external pressure is exerted to introduce the water, the waterproof cover part 330 moves to become in tight contact with the body part 320. When the first area 331 of the waterproof cover part 330 is pressed by the external pressure, the elastic portion 342 is compressed, and thus, the waterproof cover part 330 covers the body part 320 such that the separation space is not present. In this case, the rubber portion 343 may fill the space between the waterproof cover part 330 and the body portion 320 to thereby prevent introduction of water.

When the external pressure falls below the reference pressure, the waterproof cover part 330 moves away from the body part 320 to thereby form a separation space based on a length of the wire 341. Therefore, when the mobile terminal 100 is not located in water or waterproofing may be provided by the waterproof layer 109, an output space may be provided to thereby output sound from the audio output unit 152'.

Therefore, if particular water pressure or more is applied, the waterproof cover part 330 moves to block an area in which the speaker module 152 is disposed without any additional control command, to thereby block the introduction of water.

Figure 8A:
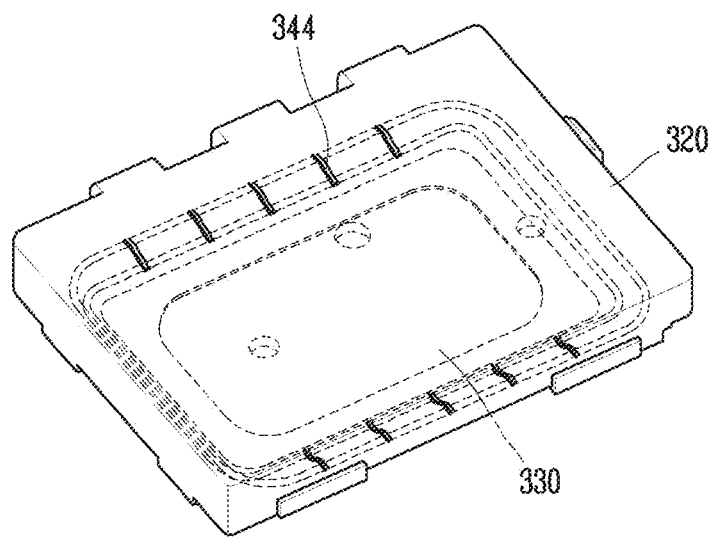
FIGS. 8A and 8B are conceptual views for explaining a water speaker module using a shape memory wire.
Figure 8B:
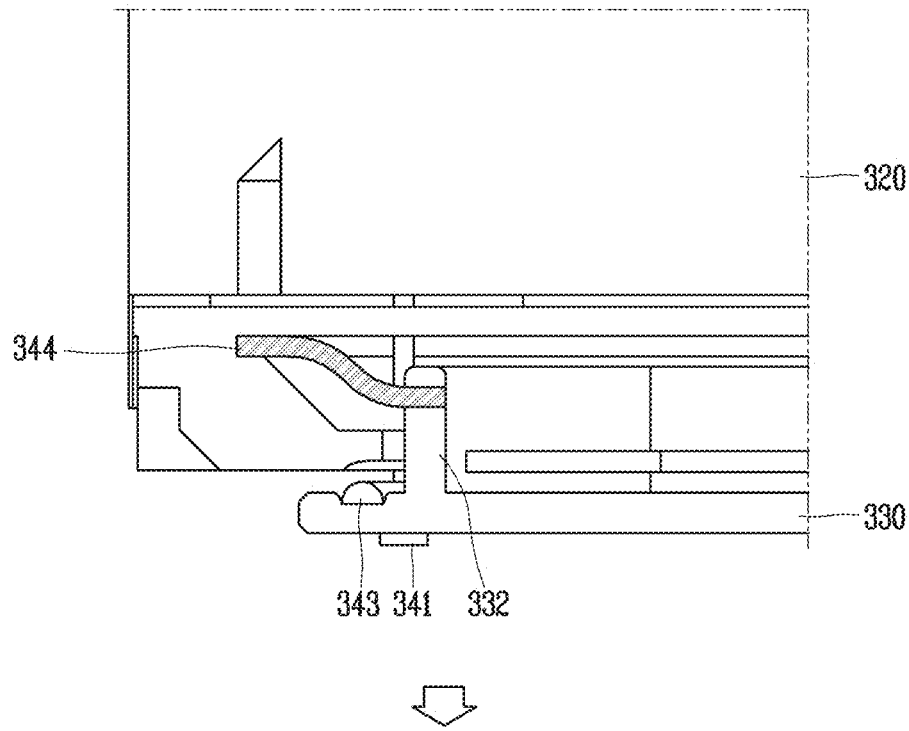
Figure 8B:
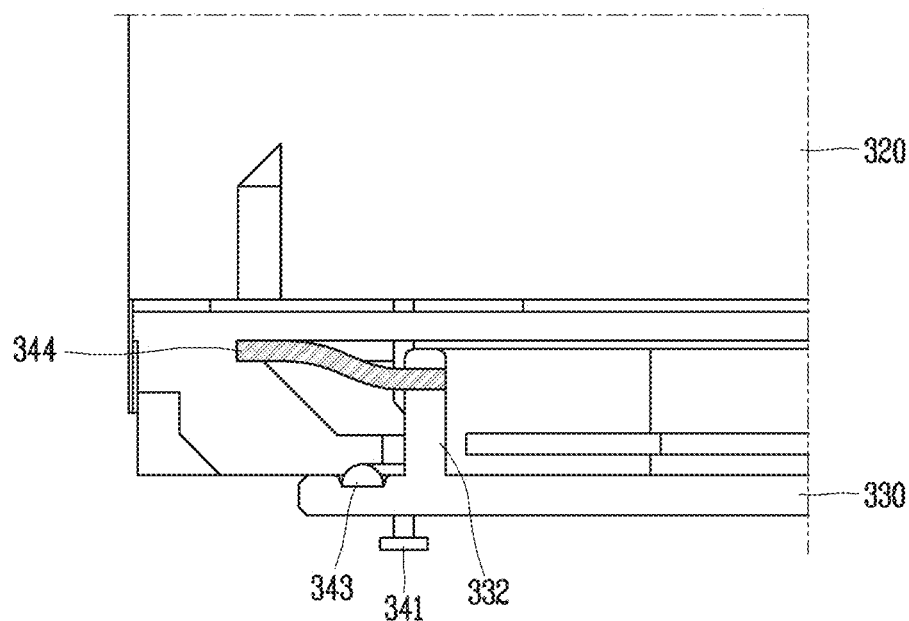

FIGS. 8A and 8B are conceptual views for explaining a water speaker module using a shape memory wire.

Other than a shape memory wire 344, components of the waterproof speaker module according to the present embodiment is substantially same as components of the waterproof speaker module of FIG. 6A. Therefore, same reference numerals are assigned to the same constituent elements, and redundant explanations are omitted.

The waterproof speaker module includes a plurality of shape memory wires 344. The shape memory wire 344 includes a shape memory alloy having a property of being deformed when a current is applied and a temperature rises.

One end of the shape memory wire 344 is fixed to the second area 332 of the waterproof cover part 330 and another end of the shape memory wire 344 is fixed to one area of the body part 320. When a particular control command or such information that the mobile terminal 100 enters water is collected or detected, the controller 180 supplies current to the shape memory wire 344. When a length of the shape memory wire 344 is shortened due to the current, the waterproof cover part 330 moves in a direction to be adjacent to the body part 320. Accordingly, water flowing into the audio output unit 152' may be blocked.

According to the present embodiment, the waterproof cover part 330 may be moved based on the control command. Even when the waterproof cover part 330 does not move sufficiently, since the shape memory wire 344 guides physical movement of the waterproof cover part 330, water that is to flow into the speaker module 152 may be effectively blocked.

Figure 9A:
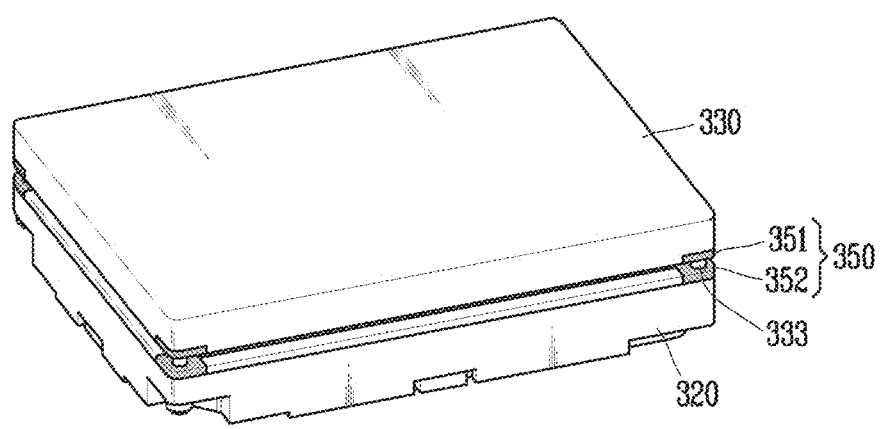
FIGS. 9A and 9B are conceptual views for explaining a water speaker module according to still another embodiment.
Figure 9B:
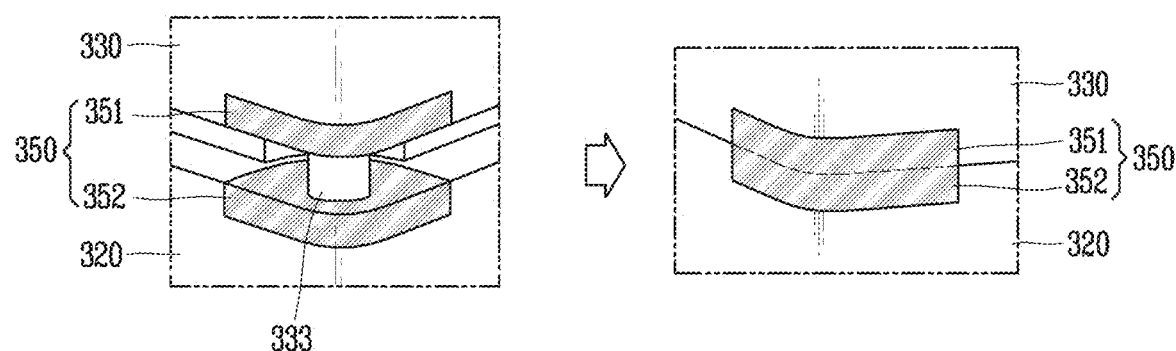

FIGS. 9A and 9B are conceptual views for explaining a water speaker module according to still another embodiment.

The waterproof speaker module according to the present embodiment includes the body part 320 accommodating the speaker module 152, the waterproof cover part 330, and a magnet portion 350 for coupling the body part 320 to the waterproof cover part 330. The body part 320 and the waterproof cover part 330 are similar to the body part 320 and the waterproof cover part 330 of FIGS. 6A to 6C.

Accordingly, the same reference numerals are assigned to the body part 320 and the waterproof cover part 330, and redundant description will be omitted. In addition, the mobile terminal 100 according to the present embodiment further includes a barometric pressure sensor for sensing atmospheric pressure.

The waterproof cover part 330 includes a coupling bar 333 protruding from each corner and passing through one area of the body part 320. The coupling bar 333 has a preset length. The waterproof cover part 330 moves in a state when the waterproof cover part 330 is connected to the body part 320 by the coupling bar 333. The waterproof cover part 330 moves away from or close to the body part 320 with reference to the coupling bar 333. When the waterproof cover part 330 is located away from the body part 320, sound output from the audio output unit 152' is output to a separation space between the body part 320 and the waterproof cover part 330.

The waterproof speaker module includes a plurality of magnet portions 350. The magnet portions 350 include first and second magnets 351 and 352. The first and second magnets 351 and 352 include electromagnets generating magnetism according to supply of a current.

The first and second magnets 351 and 352 may be provided to cover the coupling bar 333. When the controller 180 determines that the mobile terminal 100 enters water based on the barometric pressure sensor for measuring the atmospheric pressure, the controller 180 supplies current to the magnet portions 350. According to the supply of the current, an attractive force is generated by the magnetism of the first and second magnets 351 and 352. Thus, according to the attractive force of the first and second magnets 351 and 352, the waterproof cover part 330 moves to become in tight contact with the body part 320.

According to the present embodiment, driving of an electromagnet is controlled by sensed pressure. Thus, even when the waterproof cover part 330 may not be affected by external pressure, the waterproof cover part 330 may be moved based on driving of the electromagnet to thereby effectively block movement of water from flowing into the body part 320.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

INDUSTRIAL APPLICABILITY

The present disclosure relates to a waterproof mobile terminal and may be utilized in various industrial fields related thereto.

The invention claimed is:

1. A mobile terminal comprising:
a terminal body comprising an opening region through which sound is output; and
a waterproof speaker module that is arranged adjacent to the opening region and outputs the sound,
wherein the waterproof speaker module comprises:
a speaker module that forms the sound;
a housing that accommodates the speaker module and comprises a sound hole via which the sound is output; and
a cover part that is connected to the housing to thereby form a separation space to which the sound is output through the sound hole, and covers the sound hole by moving according to water pressure equal to or higher than particular reference pressure, to thereby block water from flowing into the speaker module,
wherein the housing further comprises:
a first case; and
a second case comprising a recessed area in which the cover part is mounted and connected to the sound hole,
wherein the cover part comprises:
a cover area configured to be seated in the recessed area of the second case in response to the water pressure or external pressure; and
a protruding area protruding from the cover area and movably fixed to the second case,
wherein the protruding area comprises:
a first area configured to move through a locking hole in the second case; and
a second area formed at an end portion of the first area and having an outer circumference greater than an inner circumference of the locking hole such that the second area is blocked by the locking hole when the second area is in close proximity to the locking hole, and
wherein the water pressure or external pressure applied to the cover area causes the cover area to be in tight contact with the recessed area and causes the second area of the protruding area to move away from the locking hole.

2. The mobile terminal of claim 1, further comprising an elastic portion that covers the second area and elastically supports the cover area in a direction of moving away from the second case.

3. The mobile terminal of claim 1, wherein the second case further comprises an accommodation area in which the second area is movably accommodated and which is connected to the locking hole.

4. The mobile terminal of claim 1, further comprising a waterproof layer that blocks the opening region to thereby block movement of water and output sound at water pressure less than the particular reference pressure.

5. The mobile terminal of claim 1, wherein the cover part comprises a first area having a plate shape and a second area protruding from the first area and movably mounted in the housing, and
the cover part is fixed to be relatively movable with reference to the housing, as a wire having one end fixed to the housing passes through the cover part.

6. The mobile terminal of claim 5, wherein the wire passes through the first area of the cover part, and
wherein the wire further comprises a locking portion at another end of the wire so that the cover part is locked in the locking portion, when the cover part and the housing form the separation space.

7. The mobile terminal of claim 6, further comprising an elastic portion that is provided to cover the wire, and elastically supports the cover part in a direction in which the cover part becomes far from the housing.

8. The mobile terminal of claim 5, wherein the housing further comprises a guide hole through which the second area of the cover part passes, allowing the second area of the cover part to move.

9. The mobile terminal of claim 5, further comprising a rubber portion provided on a surface of the first area of the cover part facing the housing to cover the second area of the cover part to thereby block movement of water when the cover part is adjacent to the housing.

10. The mobile terminal of claim 1, further comprising a shape memory wire having both ends being fixed to the housing and the cover part, respectively,
wherein the shape memory wire is contracted by current supplied based on a particular control command so that the housing becomes close to the cover part.

11. The mobile terminal of claim 1, further comprising a first magnet fixed to the cover part and a second magnet fixed to the housing to face the first magnet,
wherein an attraction force is formed between the first magnet and the second magnet based on a particular control command.

12. The mobile terminal of claim 11, further comprising:
a pressure sensor that senses pressure; and
a controller that controls the attraction force to be generated between the first and second magnets, based on the pressure sensed by the pressure sensor.

13. The mobile terminal of claim 1, wherein the second area of the protruding area is not positioned in the locking hole.

14. The mobile terminal of claim 1, wherein a portion of the first area of the protruding area is positioned between the second area of the protruding area and the locking hole when the cover area is in tight contact with the recessed area of the second case.

* * * * *